United States Patent [19]
Ryberg

[11] 3,806,713
[45] Apr. 23, 1974

[54] METHOD AND APPARATUS FOR MAXIMIZING THE LENGTH OF STRAIGHT LINE SEGMENTS APPROXIMATING A CURVE

[75] Inventor: Arlen W. Ryberg, Los Angeles, Calif.

[73] Assignee: Honeywell Information Systems Inc., Waltham, Mass.

[22] Filed: Oct. 21, 1971

[21] Appl. No.: 191,262

[52] U.S. Cl............. 235/151.11, 318/570, 318/573, 318/685
[51] Int. Cl. .......................................... G06f 15/46
[58] Field of Search.......... 235/151.11, 151.32, 189, 235/191; 318/570, 571, 573, 574, 603, 685, 696; 340/172.5; 444/1

[56] References Cited
UNITED STATES PATENTS

| | | | |
|---|---|---|---|
| 3,544,968 | 12/1970 | Lattimore et al. | 340/172.5 |
| 3,450,865 | 6/1969 | Peras | 235/189 X |
| 3,585,478 | 6/1971 | Leenhouts | 235/151.11 UX |
| 3,538,315 | 11/1970 | Reuteler | 235/151.11 |

Primary Examiner—Malcolm A. Morrison
Assistant Examiner—Jerry Smith
Attorney, Agent, or Firm—John S. Solakian; Ronald T. Reiling

[57] ABSTRACT

In a system having a rotational axis and a radial axis, a method and apparatus is disclosed for maximizing the length of straight line segments approximating a curve while maintaining the approximation within a predefined tolerance of the desired curve, in accordance with the formula:

$$\Delta\theta = \theta_T \ \sqrt{E/R_T}, \text{ where}$$

$\Delta\theta$ is the length in number of steps along the rotational axis of successive straight line approximations of the curve,
$R_T$ is the total number of steps to be taken along the radial axis for a given curve,
$\theta_T$ is the total number of steps to be taken along the rotational axis for a given curve, and
$E$ is the maximum error in steps along the radial axis between a given curve and the approximated curve.

9 Claims, 4 Drawing Figures

METHOD AND APPARATUS FOR MAXIMIZING THE LENGTH OF STRAIGHT LINE SEGMENTS APPROXIMATING A CURVE

BACKGROUND OF THE INVENTION

The present invention generally relates to numerical control systems and more particularly to a system in which a curve to be traced or moved is divided into a plurality of segments or interpolation lengths which provide a successive straight line approximation of the curve.

In a computer controlled machine tool system, both speed and accuracy are important parameters in the production of, for example, a workpiece such as a cam. Usually however, speed is decreased for increased accuracy and vice versa. If a predetermined curve is to be cut on a cam for example, it may be quite time consuming if the curve is to be cut on the cam as exactly as the system will allow. For example, in a system utilizing stepping motors, either or both motors would be moved a step at a time to obtain the best possible reproduction of the curve. In some situations it is not necessary to reproduce a given curve exactly. A given error in reproduction of the curve may be tolerable. If this is the case, a savings in time may be realized by moving the motors a plurality of steps over a predetermined time period.

It is therefore an object of the invention to provide a system for controlling the movement of stepping motors in which the calculation time required for such control is reduced.

It is a further object of the invention to provide a novel method and apparatus for maximizing the length of straight line segments of a curve while maintaining the resultant or approximated curve within a given tolerance of the desired curve.

SUMMARY OF THE INVENTION

The purposes and objects of the invention are satisfied by providing in a numerical control system having a rotational axis and a radial axis, a method and apparatus for maximizing the length of straight line approximations of a curve in order to generate a path approximating the curve while maintaining the path within a predefined tolerance of the curve. The length of each straight line approximation expressed in terms of the number of steps along the rotational axis for each straight line approximation is determined by multiplying the total number of steps to be taken along the rotational axis for a given curve times a function of the quantity resulting from dividing a predetermined maximum error in number of steps along the radial axis by the total number of steps to be taken along the radial axis for the given curve. The resultant length is then utilized in combination with a table defining the given curve in order to generate the path approximating the given curve.

BRIEF DESCRIPTION OF THE DRAWINGS

The advantages of the foregoing configuration of the invention become more apparent upon reading the accompanying detailed description in conjunction with the figures in which.

DETAILED DESCRIPTION OF THE PREFERRED EMBODIMENTS

In a machine tool control system having a rotational axis and a radial axis, a tool is moved relative to a workpiece in order to produce a workpiece having a specified contour made up of different curves. Some such curves for example are termed cycloidal, harmonic, modified trapezoid, eighth order polynomial, semicircle, etc. In such a system utilizing stepping motors to control movement along each axis, the curves are approximated by very short successive straight line segments, the length of which is dependent on the degree of rotation of the motors for each step. It should be noted at this point that the straight line segments herein referred to are actually curved segments due to the fact that there is a rotational axis in the apparatus used with the present invention. It is very desirable to have such minute straight line approximations because of the increased accuracy that this gives in the approximation of the desired curve. However, it is not always necessary in the production of a workpiece to obtain a product which is as accurate as the system will allow. That is, the straight line approximations may be made longer depending upon the error allowable. Thus, each minute step of the motors is not necessary if a given error is tolerable and accordingly the motors may be moved a plurality of steps over any predetermined time period to produce one straight line of the plurality of straight lines approximating the curve.

In a computer controlled machine tool system, the reduction in the required number of calculations which number is proportional to the number of steps for a given curve, increases the speed with which a workpiece may be produced because of reduced computer time requirements. For a curve which is expressed in the total number of steps along each axis, and where the error tolerable is expressed in terms of the maximum error in steps along the radial axis, it has been found that the maximum length ($\Delta\theta$) of the straight line segments for the curve as expressed in terms of number of steps along the rotational axis may be expressed:

$$\Delta\theta = \theta_T / \sqrt{R_T/E}, \text{ or}$$

expressed another way: $\Delta\theta = \theta_T \sqrt{E/R_T}$, where $\theta_T$ = the total number of steps to be taken along the rotational axis for a given curve, $R_T$ = the total number of steps to be taken along the radial axis for a given curve, and $E$ = the maximum error in number of steps along the radial axis between a given curve and the approximated curve.

Figure 1:
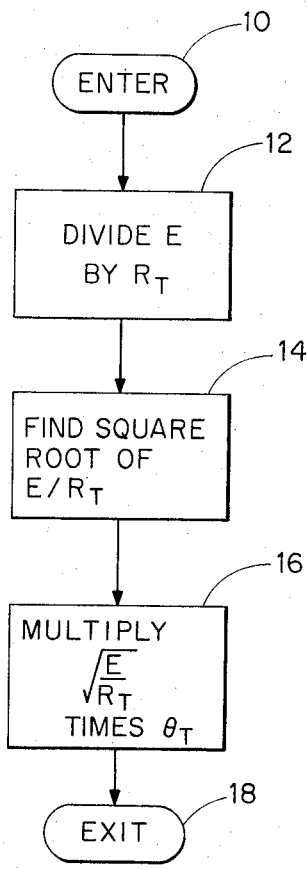
FIG. 1 illustrates a simple flow diagram of the invention.

FIG. 1 illustrates a simple flow diagram used to calculate $\Delta\theta$. The diagram is entered at block 10 after which E is divided by $R_T$ (block 12) to give a value whose square root is determined (block 14). The value of $\Delta\theta$ is then computed by multiplying $\theta_T$ times the square root of $E/R_T$ (block 16) after which the flow diagram is exited (block 18). The flow diagram of FIG. 1 is exemplary and it is understood that the basic formula may have been computed in a number of ways. There are two special cases to the formula. A first is when E is to be minimal or equal to zero in which case $\Delta\theta$ is set to be equal to one. This is accomplished as shown in blocks 28 and 30 of FIG. 2. A second is when $R_T$ is equal to zero in which case $\Delta\theta$ is set equal to $\theta_T$ or any other convenient value. This is accomplished as shown in blocks 22 and 34 of FIG. 2. Note that these exceptions are required because the above-noted formula breaks down.

Figure 2:
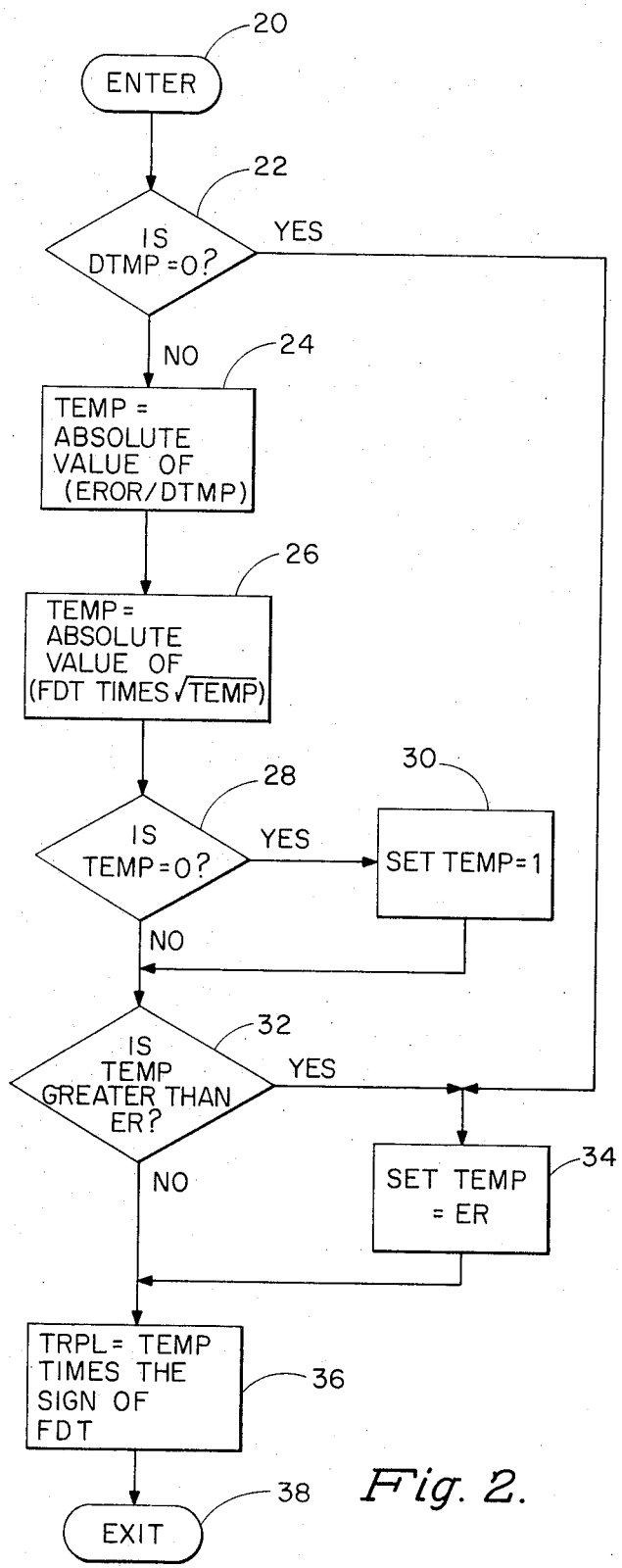
FIG. 2 illustrates a more detailed flow diagram of the invention.

More specifically, FIG. 2 illustrates the flow diagram of FIG. 1 together with the special cases noted above. The terminology is expressed by different notations, where: EROR = E, DTMP = $R_T$, FDT = $\theta_T$, TRPL = $\Delta\theta$ and ER is the maximum size allowed for TRPL ($\Delta\theta$). Thus in FIG. 2, after the flow diagram is entered (block 20), EROR/DTMP is determined (block 24) if DTMP is not equal to zero (block 22). Note that in block 24, EROR/DTMP is a variable called Temp. In block 26, Temp is the absolute value of FDT times the square root of Temp, which last-mentioned Temp is that value given it in the previous block 24. Thus, Temp refers to the last-mentioned value of Temp. The value of TRPL (Temp) is then computed by multiplying FDT times the square root of EROR/DTMP (block 26). If TRPL is equal to zero, then TRPL is set equal to one (block 30). If TRPL is greater than ER, (block 32), TRPL is set equal to ER (block 34). If DTMP was equal to zero (block 22), TRPL is set equal to ER also (block 34). The signed value of TRPL (i.e., CW or CCW movement) is then determined in block 36 after which the flow diagram exits (block 38).

Figure 3:
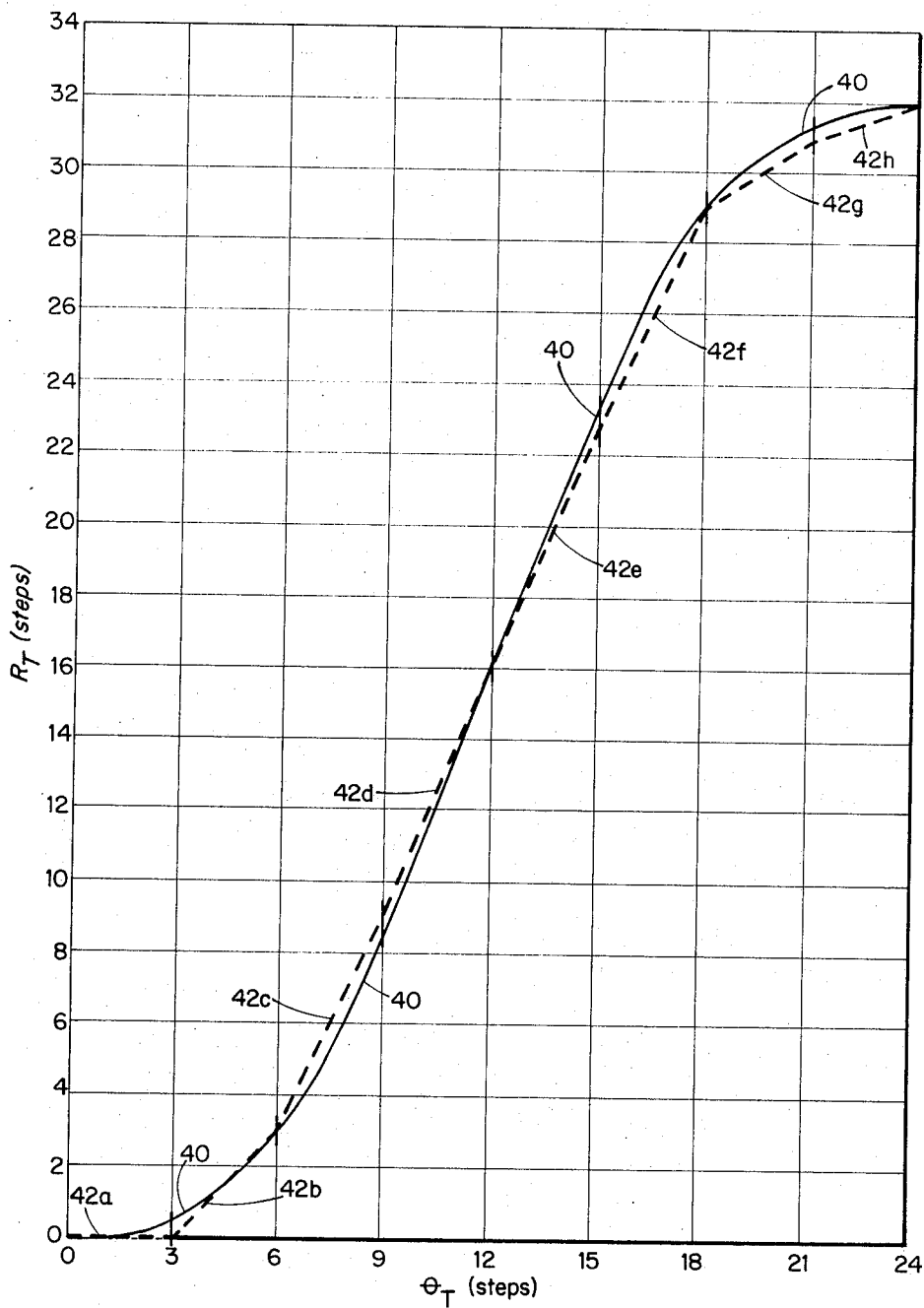
FIG. 3 illustrates a curve and an exemplary path approximating the curve in accordance with the teachings of the invention.

FIG. 3 illustrates a cycloidal curve 40 which is traced with 24 steps along the rotational axis as indicated by the $\theta_T$ coordinates of the graph and 32 steps along the radial axis as indicated by the $R_T$ coordinates of the graph. The curve 40 is shown in an X-Y plot for convenience of illustration. In accordance with the above formula where $\Delta\theta = \theta_T \sqrt{E/R_T}$, $\Delta\theta$ was determined to be three steps where the error (E) was to be a maximum of 0.5 steps. Thus, the cycloidal curve 40 is shown approximated by the dotted line paths 42a through 42h, which paths are successive straight line approximations of curve 40. In a further example (not shown), if E is predetermined to be two steps, then $\Delta\theta$ will be six steps so that the curve 40 is approximated by four successive straight line segments.

Thus there has been shown a method for maximizing the length of straight line approximations of a curve while keeping the approximation within a given tolerance of the curve. This method has been carried out by a computer program in accordance with the program listings hereinafter included of one embodiment of the invention, and which listings further explain and illustrate the invention. The computer may be any general purpose digital computer and by way of example may be the Honeywell H316 or DDP-516 general purpose computers. The printout of the listings is written in an assembly language known as Honeywell DAP-16 Assembly Language and was used with the Honeywell H316 computer. The DAP-16 Assembly Language is described in a Honeywell publication entitled "DDP-116/416/516/H316 DAP-16 and DAP-16 Mod 2 Assembly Language, Assembler Manual," Document No. 70130072442A, Order No. M-1756, dated August, 1970. The Honeywell DAP-16 Mod 2 Assembler may be utilized to implement the listings into machine language.

Figure 4:
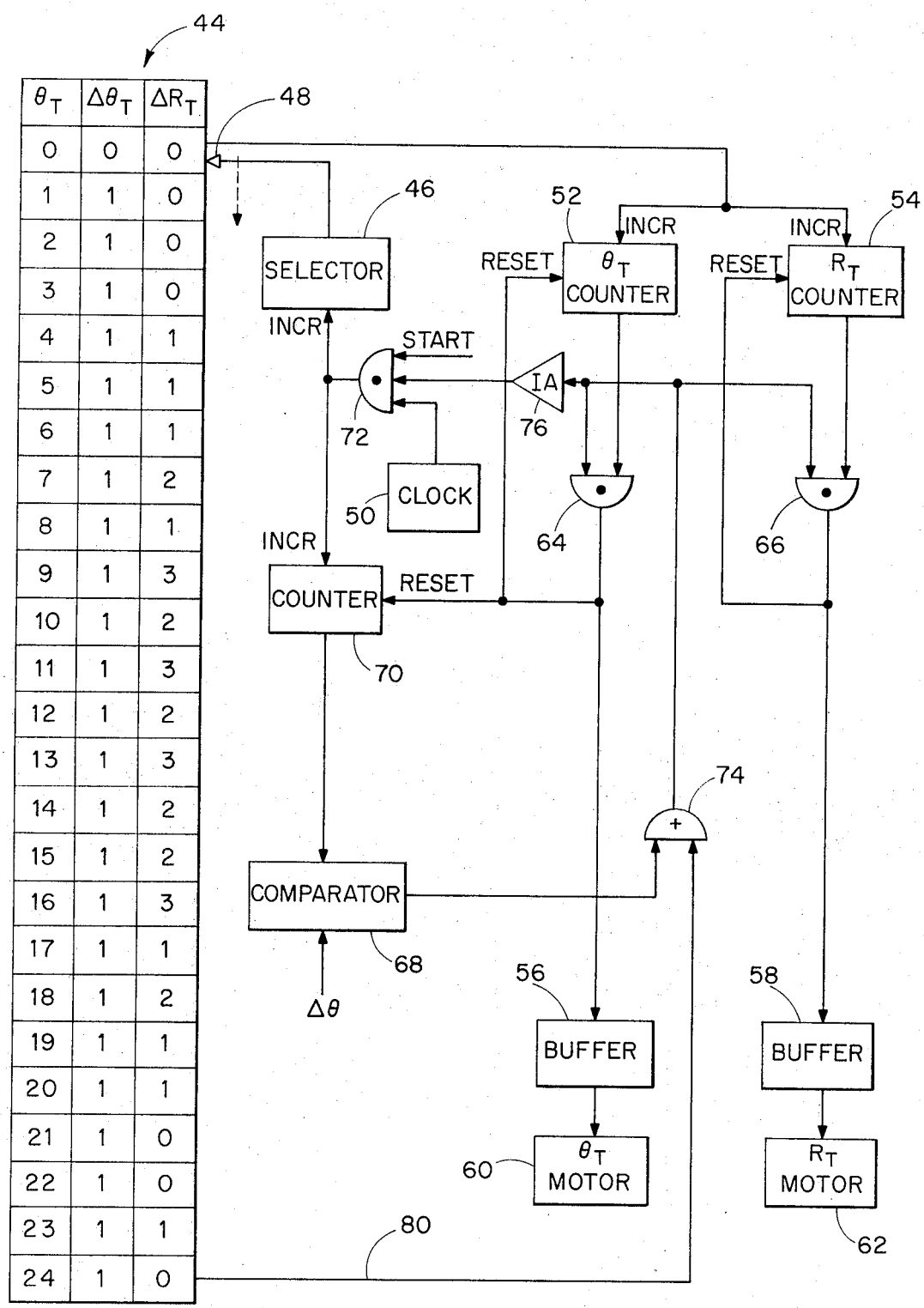
FIG. 4 is a block diagram illustrating the use of the results given by the flow diagrams of FIG. 1 and/or FIG. 2 in order to produce a path approximating the curve.

With reference to FIG. 4, the motors 60 and 62 that may be used are stepping motors such as those available from Superior Electric Company under the name SLO-SYN motor. The interface between the motors and the computer such as buffers 56 and 58 may be those available from the last-mentioned company under the name SLO-SYN Series HTR400 pulse to motor translator.

FIG. 4, illustrates the manner in which $\Delta\theta$ is utilized in order to generate the approximated curve. A table 44 is shown to include values of $\Delta\theta_T$ and $\Delta R_T$ where $\Delta\theta_T$ is equal to one and is repeated a number of times equal to $\theta_T$. The values of $\Delta R_T$ are those computed in accordance with the desired curve. In this case table 44 depicts values for $\Delta\theta_T$ and $\Delta R_T$ which could be used to reproduce the cycloidal curve of FIG. 3 with the minimal possible error. The table 44 may be included as part of a standard memory or a read-only memory in a computer (not shown). The table 44 is addressed in a conventional manner as shown for example by selector 46. Selector 46 is shown pointing to an initial position and steps the pointer 48 at a rate governed by clock 50 coupled to the increment input of selector 46. Two counters 52 and 54 are utilized to receive and be incremented by the information in table 44, $\Delta\theta_T$ and $\Delta R_T$ respectively, addressed by selector 46. The value in each counter is coupled to buffers 56 and 58 via gates 64 and 66 respectively only after a positive comparison is made by comparator 68 between the value of $\Delta\theta$ and a value indicative of the number of times selector 46 has been incremented as indicated by counter 70.

In operation, a START signal partially enables gate 72 which is further enabled by pulses from a clock 50 and the absence of a comparison in comparator 68 as indicated via gate 74 and inverting amplifier 76 to increment selector 46 as well as counter 70. Since in this example, as before, $\Delta\theta$ is equal to three, the output of counter 70 is a one and does not produce a positive comparison. When selector 46 is incremented it now points to $\theta_T = 1$, so that the information, $\Delta\theta_T$ and $\Delta R_T$ is sent to counters 52 and 54 respectively to increment them as required. After counter 70 increments to a count of three a comparison is produced by comparator 68, thereby enabling gates 64 and 66 whose counters have been incremented to include that information for the $\theta_T$ positions one through three. Accordingly, buffer 56 receives a value of $\theta_T = 3$ and a value of $R_T = 0$ and the motors 60 and 62 are stepped three and zero steps respectively over a predetermined time period. The output of comparator 68 via inverting amplifier 76 disables gate 72 at this time so that the selector 46 is not incremented. After a signal is received at the output of gate 64, it resets counter 70 so that selector 46 may again be incremented. This process continues until the motors have been stepped as required. Should the value of $\Delta\theta$ not divide evenly into the value of $\theta_T$, then for the last steps of the motors, a signal on line 80 indicative of the fact that pointer 48 is at the last position of table 44, generates a signal via gate 74 to enable gates 64 and 66.

It should be realized that various combinations of gates and counters may have been used to accomplish the above without departing from the scope of the invention. It should also be understood that various delays may be included in order to avoid race conditions. It should also be understood that the values in the table 44 may have been cumulative values of the number of steps required of the motors and not delta values as shown.

The following is a printout of the program listings hereinbefore referenced.

| 3175 | | | | | | Arlen's interpolation algorithm |
|------|------|------|------|------|------|------|
| 3176 | | | | | | Chord = theta − SQRT (EROR/displacement) |
| 3177 | | | | | | |
| 3178 | 05017 | 0 02 00020 | | DLD | EROR | Pulses difference between true arc and chord. |
| 3179 | 05020 | 0 10 00000 | | CALL | D$22 | |
| 3180 | 05021 | 0 000030 | | DAC | DTMP | The displacement. |
| 3181 | 05022 | 100400 | | SPL | | |
| 3182 | 05023 | 0 10 00000 | | CALL | N$22 | |
| 3183 | 05024 | 0 10 00000 | | CALL | SQRT | |
| 3184 | 05025 | 0 10 00000 | NXT8 | CALL | N$22 | |
| 3185 | 05026 | 0 000116 | | DAC | FDT | We now have interpolation distance. |
| 3186 | 05027 | 0 10 00000 | | CALL | C$24 | Convert to D.P.I. |
| 3187 | 05030 | 000005 | | SGL | | |
| 3188 | 05031 | 0411 61 | | LLS | 15 | Put in A-reg. |
| 3189 | 05032 | 100400 | | SPL | | |
| 3190 | 05033 | 140600 | | SCB | | Set the C-bit to its sign. |
| 3191 | 05034 | 101040 | | SNZ | | |
| 3192 | 05035 | 0 01 05152 | | JMP | NXT2 | It's smaller than ½ pulse. |
| 3193 | 05036 | 100400 | | SPL | | |
| 3194 | 05037 | 140407 | | TCA | | Make it positive. |
| 3195 | 05040 | 0 11 00115 | | CAS | ER | Don't let it get larger than ¼ of a degree. |
| 3196 | 05041 | 0 02 00115 | | LDA | ER | |
| 3197 | 05042 | 101000 | | NOP | | |
| 3198 | 05043 | 100001 | NXT3 | SRC | | Make it the proper sign. |
| 3199 | 05044 | 140407 | | TCA | | |
| 3200 | 05045 | 0401 61 | | LRS | 15 | Make it D.P.I. |
| 3201 | 05046 | 0 10 00000 | | CALL | C$42 | Convert to fl.pt. |
| 3202 | 05047 | 0 04 00104 | | DST | TRPL | Save it. |
| 3284 | | | | − | | Interpolation less than ½ |
| 3285 | 05152 | 0 02 00116 | NXT2 | LDA | FDT | Sign of theta into C-bit. |
| 3286 | 05153 | 0414 77 | | LGL | 1 | |
| 3287 | 05154 | 0 02 00335 | | LDA | ONE | Interpolation of 1 go back. |
| 3288 | 05155 | 0 01 05043 | | JMP | NXT3 | |

I claim:

1. In a system having first and second stepping motors for controlling movement along a rotational axis and a radial axis respectively, apparatus for determining the maximum length of each of a plurality of straight lines approximating a curve in order to generate a path approximating said curve while maintaining said path within a predefined tolerance of said curve, said apparatus comprising:
   A. a storage table having a plurality of values for defining said specified curve in accordance with the maximum accuracy of said system;
   B. means for addressing said table;
   C. means for incrementing said means for addressing;
   D. means for generating an enable signal each time said means for addressing has been incremented a number of times equal to the number of steps along the rotational axis of each straight line approximation of said curve;
   E. means for accumulating said values addressed substantially between successive generation of said enable signal; and
   F. means for incrementing said motors in accordance with the respective accumulated value for the respective motors.

2. Apparatus as defined in claim 1 wherein said table comprises a plurality of positions equal in number to the total number of steps required of said first motor for movement along said rotational axis in order to substantially generate said curve and wherein each of said positions has associated therewith corresponding values of the number of steps required for each motor in order to optimally in accordance with the specifications of said system generate said path approximating said curve.

3. Apparatus as defined in claim 2 wherein said means for accumulating comprises:
   A. a first counter coupled to be incremented by the value for said rotational motor each time a position in said table is addressed;
   B. a second counter coupled to be incremented by the value for said radial motor each time a position in said table is addressed;
   C. wherein the counts as incremented in said counters are the respective accumulated values; and
   D. means for resetting the count of said counters each time said enable signal is generated.

4. Apparatus as defined in claim 1 wherein said means for generating comprises:
   A. a counter coupled to be incremented each time said means for addressing is incremented; and
   B. a comparator coupled to generate said enable signal when the count of said counter and the number of steps along said rotational axis in order to move said maximum length are equal.

5. Apparatus as defined in claim 4 wherein said means for generating further comprises means for resetting said counter each time said enable signal is generated.

6. In a system having first and second stepping motors for controlling movement along a rotational axis and a radial axis respectively, a method for calculating the number of steps ($\Delta\theta$) required of said first motor for each straight line segment of a plurality of segments approximating a specified curve while maintaining within a specified error (E) in steps of said second motor, the error produced between said specified curve and a curve approximated by said plurality of straight line segments, said method comprising the steps of:
   A. determining a first value by dividing said error, E, by the total number of steps required of said second motor to trace said specified curve;

B. determining said number of steps, $\Delta\theta$, by multiplying the total number of steps required by said first motor to trace said specified curve times approximately the square root of said first value;

C. generating a first plurality of commands for said first motor, each command of said first plurality indicating a number of steps to be moved by said first motor, and said first plurality of commands indicating the total number of steps to be moved by said first motor in order to trace said specified curve;

D. generating a second plurality of commands equal in number to the number of commands in said first plurality, each command of said second plurality:

1. indicating a number of steps to be moved by said second motor, and
2. corresponding to associated ones of said commands of said first plurality and said second plurality of commands indicating the total number of steps to be moved by said second motor in order to trace said specified curve;

E. selecting a submultiple of commands of each of said first and second plurality of commands, each of said submultiple of commands spaced in accordance with the value of $\Delta\theta$; and F. stepping said motor in accordance with said submultiple of commands.

7. In a system having first and second stepping motors for controlling movement along a rotational axis and a radial axis respectively, a method for calculating the number of steps ($\Delta\theta$) required of said first motor for each straight line segment of a plurality of segments approximating a specified curve while maintaining within a specified error (E) in steps of said second motor, the error produced between said specified curve and a curve approximated by said plurality of straight line segments, said method comprising the steps of:

A. determining a first value by dividing said error, E, by the total number of steps required of said second motor to trace said specified curve;

B. determining said number of steps, $\Delta\theta$, by multiplying the total number of steps required by said first motor to trace said specified curve times approximately the square root of said first value;

C. generating a first plurality of commands for said first motor, each command of said first plurality indicating a number of steps to be moved by said first motor, and said first plurality of commands indicating the total number of steps to be moved by said first motor in order to trace said specified curve;

D. generating a second plurality of commands equal in number to the number of commands in said first plurality, each command of said second plurality:

1. indicating a number of steps to be moved by said second motor,
2. corresponding to associated ones of said commands of said first plurality and said second plurality of commands indicating the total number of steps to be moved by said second motor in order to trace said specified curve;

E. stepping said first motor a number of steps as indicated by the total number of steps in a group of commands of said first plurality, said group including a number of successive commands equal in number to $\Delta\theta$;

F. stepping, simultaneously with said first motor, said second motor a number of steps as indicated by the total number of steps in a group of commands of said second plurality, said last mentioned group including a number of successive commands equal in number to $\Delta\theta$; and G. repeating said steps of stepping until said approximate curve is traced.

8. In a system having first and second stepping motors for controlling movement along a rotational axis and a radial axis respectively, computer means for calculating the number of steps ($\Delta\theta$) required of said first motor for each straight line segment of a plurality of segments approximating a specified curve while maintaining within a specified error (E) in steps of said second motor, the error produced between said specified curve and a curve approximated by said plurality of straight line segments, said system comprising:

A. computer means comprising means for determining a first value by dividing said error, E, by the total number of steps required of said second motor to trace said specified curve and for determining said number of steps, $\Delta\theta$, by multiplying the total number of steps required by said first motor to trace said specified curve times approximately the square root of said first value;

B. means for generating a first plurality of commands for said first motor, each command of said first plurality indicating a number of steps to be moved by said first motor, and said first plurality of commands indicating the total number of steps to be moved by said first motor in order to trace said specified curve;

C. means for generating a second plurality of commands equal in number to the number of commands in said first plurality, each command of said second plurality:

1. indicating a number of steps to be moved by said second motor, and
2. corresponding to associated ones of said commands of said first plurality and said second plurality of commands indicating the total number of steps to be moved by said second motor in order to trace said specified curve;

D. means for selecting a submultiple of commands of each of said first and second plurality of commands, each of said submultiple of commands spaced in accordance with the value of $\Delta\theta$; and E. means, external to said computer means and coupled thereto, for stepping said motors in accordance with said submultiple of commands.

9. In a system having first and second stepping motors for controlling movement along a rotational axis and a radial axis respectively, computer means for calculating the number of steps ($\Delta\theta$) required of said first motor for each straight line segment of a plurality of segments approximating a specified curve while maintaining within a specified error (E) in steps of said second motor, the error produced between said specified curve and a curve approximated by said plurality of straight line segments, said system comprising:

A. computer means comprising means for determining a first value by dividing said error, E, by the total number of steps required of said second motor to trace said specified curve and for determining said number of steps, $\Delta\theta$, by multiplying the total number of steps required by said first motor to trace said specified curve times approximately the square root of said first value;

B. means for generating a first plurality of commands for said first motor, each command of said first plurality indicating a number of steps to be moved by said first motor, and said first plurality of commands indicating the total number of steps to be moved by said first motor in order to trace said specified curve;

C. means for generating a second plurality of commands equal in number to the number of commands in said first plurality, each command of said second plurality:
  1. indicating a number of steps to be moved by said second motor, and
  2. corresponding to associated ones of said commands of said first plurality and said second plurality of commands indicating the total number of steps to be moved by said second motor in order to trace said specified curve;

D. further means, external to said computer means and coupled thereto, as follows:
  1. means for stepping said first motor a number of steps as indicated by the total number of steps in a group of commands of said first plurality, said group including a number of successive commands equal in number to $\Delta\theta$;
  2. means for stepping, simultaneously with said first motor, said second motor a number of steps as indicated by the total number of steps in a group of commands of said second plurality, said last mentioned group including a number of successive commands equal in number to $\Delta\theta$; and E. means, included in both said computer means and said further means, for repeating said steps of stepping until said approximate curve is traced.

* * * * *